Sept. 23, 1952        C. A. HUMMA        2,611,653

DEMOUNTABLE WHEEL ASSEMBLY

Filed March 14, 1950        2 SHEETS—SHEET 1

Cyril A. Humma
INVENTOR.

Sept. 23, 1952  C. A. HUMMA  2,611,653
DEMOUNTABLE WHEEL ASSEMBLY
Filed March 14, 1950  2 SHEETS—SHEET 2
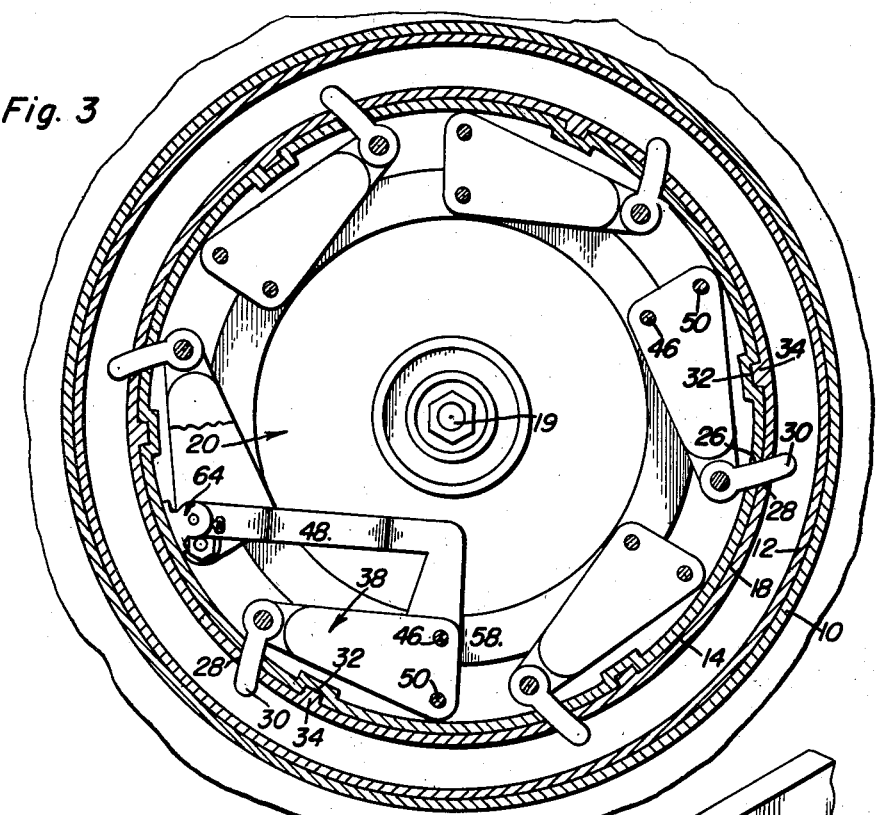
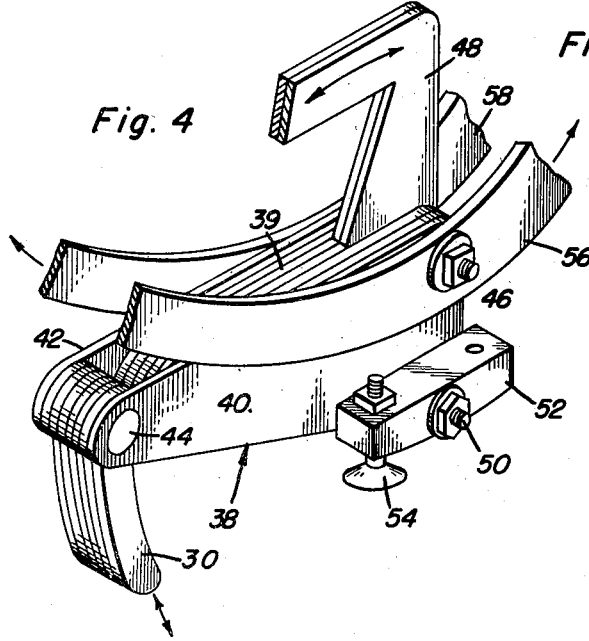
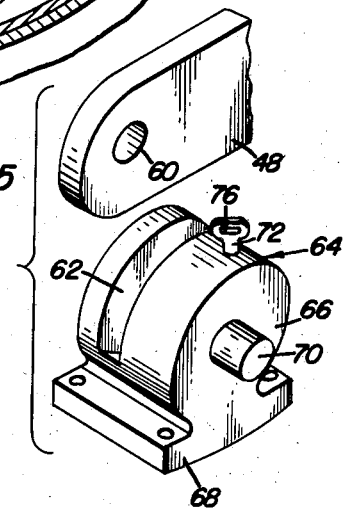
Cyril A. Humma
INVENTOR.
BY
*Attorneys*

Patented Sept. 23, 1952

2,611,653

UNITED STATES PATENT OFFICE 2,611,653

DEMOUNTABLE WHEEL ASSEMBLY

Cyril A. Humma, Kenhorst, Pa., assignor of thirty-three and one-third per cent to George Humma, Kenhorst, Pa.

Application March 14, 1950, Serial No. 149,594

3 Claims. (Cl. 301—9)

This invention relates to improvements in demountable tire and wheel assemblies and is a continuation-in-part of my abandoned application, Serial No. 732,235, filed on March 4, 1947.

An object of this invention is to releasably support a portion of a wheel and tire on a hub by means of an improved locking assembly which consists of a number of links which are pivoted to the hub of a vehicle and which are arranged to move in unison by pivoting a ring or other continuous member to each of the links, whereby they move uniformly.

Another object of this invention is to retain the rim of the assembly on the flange of the hub in such a manner that the above locking device prevents the rim from sliding off the flange and to prevent relative rotation of the hub and rim by means of another locking arrangement between the contacting surfaces of the flange and the rim.

Other objects and features will become apparent in following the description of the illustrated form of the invention.

In the drawings:

Figure 3 is a sectional view taken substantially on the line 3—3 of Figure 2 and in the direction of the arrows;

Figure 4 is a perspective view of a part of the means for causing the links to move in unison together with one of the links and a part of its mounting means; and Figure 5 is a perspective view showing a part of the operating handle for the links and the locking mechanism which retains the operating handle in a predetermined position.

Figure 1:
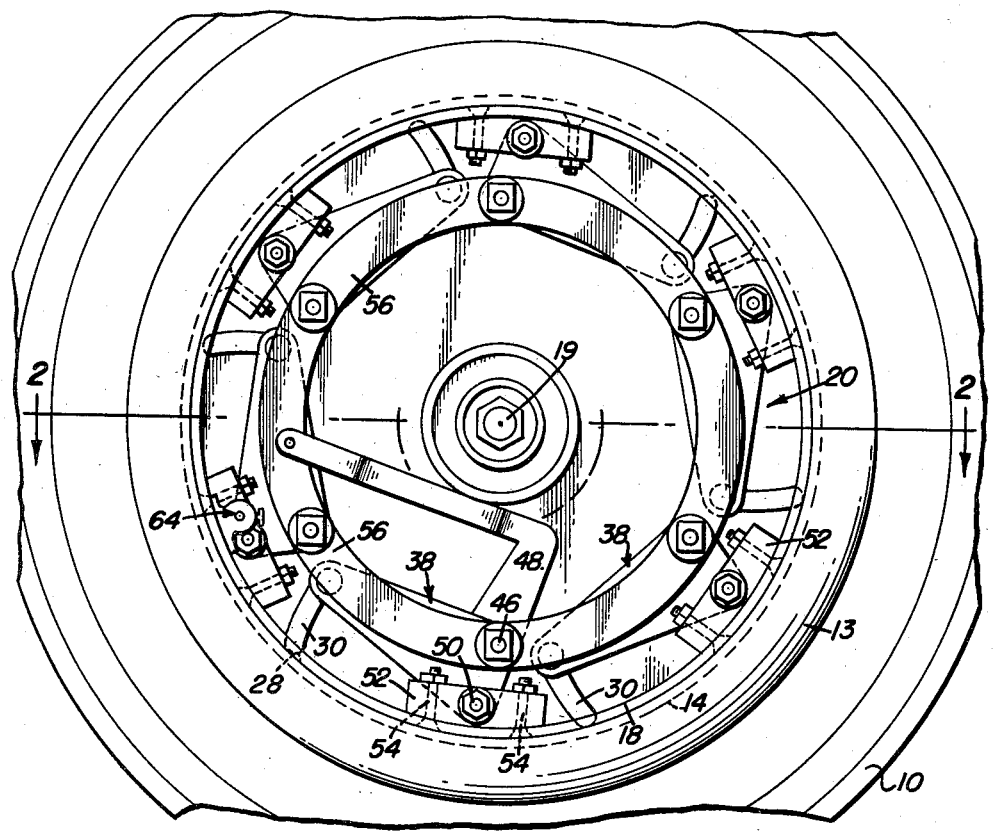
Figure 1 is an elevational view of the assembly showing it attached to a hub.

There is provided a channel 10 of circular form which is adapted to retain the beading of a conventional tire fixed therein. Secured to the inside surface of this channel is a connecting member 12, the front part 13 of which forms a visible part of the wheel. The channel 10, connecting member 12 and an inwardly directed circular plate 14 forms a rim generally indicated at 16 which is demountably carried by the flange 18 of a hub 20.

Said hub is fixed to the axle 19 (Figure 1) of a vehicle by usual means and includes as an integral part thereof the back plate 22.

At spaced places in the flange 18 there is provided openings or apertures 26 which are substantially aligned with the openings or apertures 28 in the rim 16 and, specifically, in the circular plate 14 thereof. These openings are adapted to receive the keepers 30 which are passed therethrough to thereby prevent the rim 16 from sliding outwardly or inwardly of the hub flange 18.

Grooves 32 are formed in the outside surface of the flange 18 and tongues 34 are provided on the inside surface of the member 14. This construction provides a means for preventing rotation of the rim with respect to the hub 20. However, the rim may simply be inserted from the outside thereof into locking engagement with the hub.

A number of links 38 are provided within the hub 20 and these links have the keepers 30 pivoted at one end thereof. Reference is made to Figure 4, wherein there is illustrated a single link and a single keeper. As noted, the keeper may be made of laminar construction, that is, by means of a number of pieces of the same shape superimposed upon each other. The same is true of the link 38. A number of laminations 39 are disposed between the two end plates 40 and 42 to form said link 38. A pivot pin 44 is passed through one pair of ends of said plates 40 and 42 to pivotally support the keeper 30. In the keeper 30 and the link 38 the laminations may be retained together, as by welding, or may be maintained in contacting relation but unbonded. As an obvious alternative, the link 38 may be made of one-piece construction and the same is true of the keeper 30.

The link 38 has a pivot bolt 46 passed through one corner thereof which, in this instance, passes through an operating lever 48. There is a pivot bolt 50 passed through the other corner of the link 38, this bolt also passing through a bearing block 52 which is held by means of screws 54, riveted, welded or otherwise fixed to the inside surface of the flange 18. For each link, there is at least one bearing block 52 and associated assembly provided. A rigid member 56, preferably in the form of a ring, is provided with a number of openings therein and each pivot bolt 46 is passed therethrough. An identical rigid member 58 has the pivot bolts 46 passed through openings therein. One rigid member is secured on one surface of all of the links 38, while the other rigid member is secured at the opposite surface of each link. The purpose of the rigid members 56 and 58 is to cause each of the links to move in unison so as to insert the keepers 30 into the aligned openings 28 and 26 or to withdraw the keepers therefrom.

Figure 2:
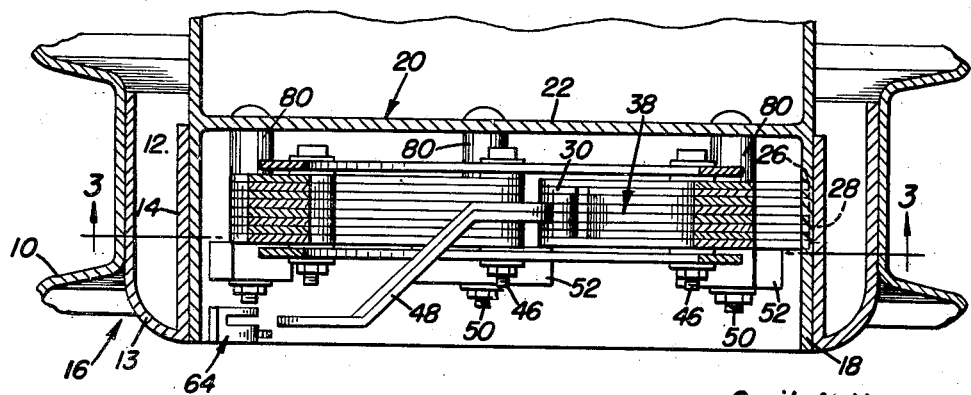
Figure 2 is a sectional view taken substantially on the line 2—2 of Figure 1 and in the direction of the arrows.

Said handle or lever 48 is provided with an offset (Figure 2) so that the end thereof which has the aperture 60 may be inserted in the slot 62 of the locking device 64. This locking device consists of a small case 66 which has a base 68 provided with openings to receive rivets, screws, or the like. Rivets or screws fix the locking device 64 to the inside surface of the flange 18.

When the handle 48 is operated, the links 38 are actuated through the action of the rigid members 56 and 58. When the lever 48 is in the "down" condition (Figure 3), the aperture 60 is aligned with the plunger 70 which is in the housing or case 66. This plunger has a gear formed therein, as a worm or rack, and is enmeshed with the operating pinion on the rotary shank 72. This rotary shank is disposed in the case 66 whereby, upon operation thereof, the plunger 70 is moved inwardly or outwardly for insertion or removal with respect to the hole 60.

A slot 76 is provided in the rotary shank 72 so that a wire may be secured thereto to insure a positive lock between the locking device 64 and the lever 48.

In operation, the lever 48 is moved so that it pivots about the pivot bolt 50 as an axis of rotation. Inasmuch as the pivot bolt 46 is passed through the lever 48, the link shown in Figure 4 is caused to be pivotally actuated about the pivot bolt 50 as an axis. At the same time, the rigid members 56 and 58 are displaced. They shift so that the centers thereof are moved and they also rotate slightly. The rotation is due to the necessary radius of curvature through which the pertinent part of the lever 48 operates. The displacement of the rigid members 56 and 58 causes all of the links to be pivotally operated about their respective pivot bolts 50 as an axis of rotation.

Although it appears that there must be pivotal movement between sections of each rigid member 56 and 58, this is not necessary when the pivot bolts 50, which are also secured to the back plate 22 of the hub 20, are provided with a slight amount of lost motion or play in their connection with the back plate 22. In this respect, the spacers 80 which are concentrically arranged on the pivot bolts 50, maintain the links 38 spaced from the back wall 22 of the hub 20 so that the keepers 30, when the links 38 are operated, engage in the substantially aligned openings 26 and 28.

Having described the invention, what is claimed as new is:

1. For use on a vehicle, a hub having a peripheral, cylindrical flange of uniform diameter, a demountable rim disposed on said flange, a rigid member located within said cylindrical flange, a plurality of links, means pivoting each of said links to said rigid member, keepers pivotally secured to said links, pivot pins securing said links to said hub, said flange and said rim having aligned openings therein which are entirely through said flange and said rim for accommodating said keepers for preventing movement of said rim with respect to said flange, said flange having outwardly opening grooves which also open at the front edge of said flange, tongues fixed to said rim and disposed in said grooves, said tongues adapted to be inserted and removed from said grooves through the open fronts of said grooves so that said rim may be slid upon said flange, one of said links having a manually operable lever extending therefrom and contained within said flange, and a locking device carried by the inner surface of said flange for releasably holding said lever in one position.

2. For use on a vehicle, a hub which includes a back plate which has a peripheral, cylindrical flange of uniform diameter extending therefrom, a rigid member located within said flange and arranged for displacement, a plurality of links disposed in said flange, each link being pivotally secured to said flange and pivotally secured to said member whereby upon displacement of said member, said links are pivotally operated, keepers carried by said links, a demountable rim disposed on the outer surface of said flange, said rim and said flange having aligned openings therein to accommodate said keepers, said openings being entirely through said flange and said rim so that said keepers pass entirely through said openings, means in addition to said keepers and openings for preventing relative rotation between said flange and said rim, said rotation preventing means including tongues and grooves interfitted and formed in said flange and said rim, a single one of said links having a lever connected therewith which is arranged to extend in a direction toward said flange and rim, said lever being adapted to be manually operated for displacing said member, and a manually operative locking device carried by the inner surface of said rim and engageable with the outer end of said lever to hold said lever in a fixed position with its outer end closely adjacent to said flange.

3. The combination of claim 2 and said links being laminated.

CYRIL A. HUMMA.

REFERENCES CITED

The following references are of record in the file of this patent:

UNITED STATES PATENTS

| Number | Name | Date |
|--------|------|------|
| 1,186,897 | Grandel | June 13, 1916 |
| 1,297,259 | Schut | Mar. 11, 1919 |
| 1,321,921 | Jacobs | Nov. 19, 1919 |
| 1,929,850 | Pohl | Oct. 10, 1933 |
| 1,988,406 | Werner | Jan. 15, 1935 |